United States Patent [19]
Meguerditchian

[11] Patent Number: 5,236,211
[45] Date of Patent: Aug. 17, 1993

[54] DRIVE SYSTEM

[76] Inventor: Ohannes Meguerditchian, 8805 Southwestern Blvd. #1203, Dallas, Tex. 75206

[21] Appl. No.: 900,233

[22] Filed: Jun. 16, 1992

Related U.S. Application Data

[63] Continuation-in-part of Ser. No. 652,786, Feb. 8, 1991, Pat. No. 5,156,412.

[51] Int. Cl.$^5$ ............................................. B62M 1/04
[52] U.S. Cl. ................................. 280/241; 280/252; 482/57
[58] Field of Search ............... 280/241, 252, 253, 255, 280/256, 257, 258; 482/57

[56] References Cited

U.S. PATENT DOCUMENTS

| | | | |
|---|---|---|---|
| 556,802 | 3/1896 | Boyle | 280/241 |
| 566,838 | 9/1896 | Boyle | 280/241 |
| 3,891,235 | 6/1975 | Shelly | 280/252 |
| 4,169,609 | 10/1979 | Zampedro | 280/241 |
| 5,044,627 | 9/1991 | Huang | 272/73 |
| 5,156,412 | 10/1992 | Meguerditchian | 280/241 |

FOREIGN PATENT DOCUMENTS

| | | |
|---|---|---|
| 2142137 | 3/1973 | Fed. Rep. of Germany . |
| 802435 | 9/1936 | France . |
| 667140 | 9/1988 | Switzerland . |
| 875366 | 8/1991 | United Kingdom . |

*Primary Examiner*—Mitchell J. Hill
*Attorney, Agent, or Firm*—Thomas L. Cantrell; H. Dale Langley, Jr.

[57] ABSTRACT

A pivoting drive system for the application of rectilinear drive force, wherein the rectilinear force is converted to a rotational force. The apparatus employs a frame on which are mounted pedals for rectilinear motion. The pedals are linked with a cable linkage and when moved along rectilinear paths cause the cable linkage to move. The cable linkage is wrapped several times around dual wrap spools which turn as the cable linkage is moved. A unidirectional clutching mechanism incorporated with the wrap spools causes a pivot axis to rotate unidirectionally on rotation of the wrap spools. The pivot axis may be connected with a sprocket and drive chain assembly to provide propulsion force, for example, to a bicycle wheel.

11 Claims, 2 Drawing Sheets

DRIVE SYSTEM

This is a continuation-in-part application of U.S. application Ser. No. 07/652,786, filed Feb. 8, 1991, now U.S. Pat. No. 5,156,412 issued Oct. 20, 1992, the content of which is hereby incorporated by reference in its entirety.

BACKGROUND OF THE INVENTION

1. Field of the Invention

The present invention relates to a drive system, and more particularly, to a propulsion system for a bicycle, or the like, having a pivotal, rectilinear motion path, wherein the pivotal, rectilinear motion is converted to a rotary motion.

2. Description of Related Art

Humankind has long aspired to achieve a more physically fit body. Devices of all sizes, shapes and configurations have been created with this purpose in mind; exercises designed to develop specific muscles in particular ways have been designed by scientists, doctors, engineers and the weekend athlete. Some of these machines and techniques improve strength, some improve conditioning and others improve muscular tone.

Regardless of this multitude of mechanisms and techniques, many deficiencies yet exist with many physical conditioning devices. Such deficiencies include non-efficient application of muscle strength from the human body to the object of the exercise as well as lost power transference. Bicycles illustrate a class of widely used exercise machines which have been the subject of various refinements. Athletes often employ bicycles for exercise as well as competition. Bicycles are also used in many countries as a mode of transportation, in addition to a means of exercise. While bicycle manufacturers have sought to produce lighter bicycles, more flexible bicycles and more durable bicycles through the use of a variety of materials, the conventional bicycle continues to employ a less than completely efficient drive train. Although this area has received considerable attention in recent years a more efficient exercise and transportation apparatus yet remains to be developed.

Conventional bicycles incorporate an axle located approximately midway between the front and rear tires. Perpendicularly affixed to the axle are shafts, at the end of which are pedals that project outwardly from the bicycle. The pedals allow the user to utilize the propulsive power generated by the human body. The axle usually has a sprocket that engages a chain driving the rear tire, and which propels the bicycle forward. Thus, the axle, shaft, and pedal configuration of the bicycle drive mechanism forces the rider to drive his or her feet and legs in a generally circular motion. This motion, while effective in creating sufficient force to propel the bicycle forward, does not do so with maximum efficiency.

The rotational motion forced upon a rider by the drive mechanism of a conventional bicycle results in lost motion and wasted energy. The bicycle's drive is developed from the downward push of the rider's legs and feet along the circular path of the pedals, and the circular path makes it difficult for the rider to exert a constant propulsive force. This inherent lost motion problem decreases the rider's ability to pace himself or herself during a long journey. Thus, a drive system which eliminates lost motion and increases the length of the power stroke would be a marked advance over the prior art. The present invention accomplishes this goal, while increasing power uniformity and decreasing the length of the rider's reset stroke. In addition, the improved drive system results in a more efficient means for the application of propulsive power and for increasing the endurance of the rider.

It has further been determined that such an improved drive system, though in any of a number of configurations thereof exhibiting certain advantages over the circular drive system of a conventional bicycle, may be best configured for maximization of motion and energy if equipped to pivot. By equipping the improved drive system to pivot, the drive system may be positioned such that the rider's force may be directed almost entirely in the direction of the rectilinear stroke thereof. Further, this pivot of the improved drive system adds to a rider's comfort since the pivot may allow alternate positioning of the travel of the rectilinear stroke according to rider preference. Incorporation of a pivot aspect in the improved drive system according to the teachings of the present invention yields an overall better bicycle drive system both in terms of efficiency and comfort.

SUMMARY OF THE INVENTION

The present invention generally provides a rectilinear motion drive system pivotal in relation to the direction of rectilinear motion. The present invention more particularly is an improved bicycle drive system comprising a drive frame, a means for mounting pedals on the drive for rectilinear motion thereon, a means on the drive frame for generating a rotating motion from the rectilinear motion of the pedals, and a means for pivotally mounting the drive frame upon a bicycle.

In another aspect, the invention includes the above-described drive system in which the means for pivotally mounting the drive frame upon a bicycle are positioned at a lower end of the drive frame, and further comprising an arcuate support guide at an upper end of the drive frame for permitting tilting alteration of direction of the rectilinear motion of the pedals.

In a further aspect, the invention also includes such drive system wherein the means for mounting pedals on the drive frame includes first and second vertically mounted, parallel rectilinear motion guides disposed between the pedals, first and second force blocks slidably mounted on the motion guides, a flexible cable, and a means for reversing direction of the flexible cable trained about the means, the flexible cable connecting the first and second force blocks.

In yet a further aspect, the invention also includes such drive system wherein the means on the drive frame for generating a rotating motion includes an idler axle mounted adjacent one end of the motion guides, having first and second idler sprockets mounted on opposite ends of the idler axle, one of the idler sprockets linked to the first force block, the other of the idler sprockets linked to the second force block, a drive axle mounted adjacent the other end of the parallel rectilinear motion guides and extending thereacross, the drive axle being aligned parallel to the idler axle and having a drive wheel mounted on the drive axle for rotation therewith, first and second power sprockets mechanically interconnected with the drive axle inwardly of the drive wheel, means for unidirectionally clutching the power sprockets, and first and second power transference chains linking the first and second power sprockets to the first and second force blocks, respectively.

In another aspect, the invention includes the above-described drive system in which the means for pivotally mounting the drive frame upon a bicycle are positioned at an upper end of the drive frame and are substantially co-axial with the means for generating a rotating motion from the rectilinear motion of the pedals.

In a further aspect, the invention also includes such drive system wherein the means for mounting pedals causes the pedals to diverge outward from the sides of the drive frame as the pedals are driven downward in rectilinear motion.

In yet a further aspect, the invention also includes such drive system wherein the means on the drive frame for generating a rotating motion includes dual wrap spools and a cable linkage attached with the means for mounting pedals and the wrap spools so that rectilinear motion of the means for mounting pedals moves the cable linkage causing the wrap spools to rotate.

In an even further aspect, the invention also includes such drive system further comprising a means for limiting range of pivot of said drive frame.

In another aspect, the invention also includes such drive system further comprising a means for restricting freedom of pivot of said drive frame.

BRIEF DESCRIPTION OF THE DRAWINGS

The invention may be better understood and its numerous objects, features and advantages become apparent to those skilled in the art by referencing the accompanying drawings in which.

DETAILED DESCRIPTION OF THE PREFERRED EMBODIMENT

Figure 1:
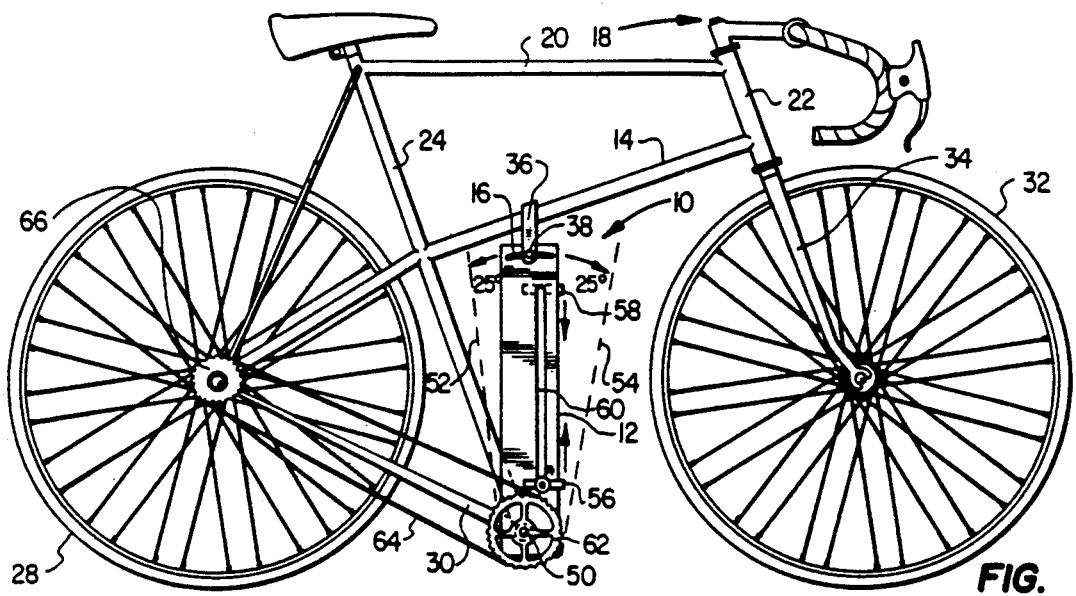
FIG. 1 is a side elevational view of a bicycle having incorporated therein one embodiment of a drive system constructed in accordance with the principles of the present invention.

Referring first to FIG. 1, there is shown a side elevational view of a bicycle 18 having one embodiment of a pivotal, vertically oriented, rectilinear travelling drive system 10 constructed in accordance with the principles of the present invention. The bicycle 18 is assembled with an upper frame member 20 extending from a front frame member 22 to a rear frame member 24. Below the upper frame member 20 is an apparatus support bracket or frame member 14, which also extends from the front frame member 20 to the rear frame member 24. The lowermost end of the rear frame member 24 intersects with the lower end of the drive system 10. The rear wheel 28 is mounted between the rear fork 30. The rear fork 30 extends from the point of engagement between the rear frame member 24 and the rectilinear travelling drive system 10. The front wheel 32 is mounted between a front fork 34. The front fork 34 extends from the bottom of the front frame member 22.

The drive system 10 includes an outer housing 12 in which the mechanics of the drive system 10 reside. The outer housing 12 of the drive system 10 is affixed at its uppermost portion to a mounting bracket 36. The mounting bracket 36 is affixed to the apparatus support bracket or frame member 14. The outer housing 12 is mounted to the mounting bracket 36 by means of an arcuate slotted guide 16. The mounting bracket 36 projects from the underside of the apparatus support bracket or frame member 14 and receives an adjustably secured pin 38, which passes into the arcuate slotted guide 16. Once in place, the adjustably secured pin 38 is tightened to provide frictional engagement between the arcuate slotted guide 16 of the drive system 10 and the mounting bracket 36.

The lowermost end of the drive system 10 is secured to bicycle 18 at the lowermost portion of the rear frame member 24. Drive axle 50 projects into the outer housing 12 and through the bicycle frame. Thus, drive axle 50 holds the lower end of the drive system 10 in place. The drive axle 50 rotates within the bicycle frame and permits the outer housing 12 to pivot about the drive axle 50. By employing the adjustably secured pin 38 in coordination with the arcuate slotted guide 16, the mounting bracket 36 and the pivoting attachment of the drive axle 50, the outer housing 12 of the drive system 10 may be angularly shifted. As a result, the outer housing may sit completely vertical within the bicycle 18, or the rider may shift the outer housing up to about 25 degrees forward or up to about 25 degrees to the rear. The angular shift is illustrated by notional lines 52 and 54.

Still referring to FIG. 1, there is shown two foot pedals 56 and 58. The foot pedals 56 and 58 travel within the pedal guide 60 located on either side of the outer housing 12. As foot pedal 56 is pushed downward by the rider, foot pedal 58 will automatically rise within the pedal guide 60. The up and down motion of the foot pedals 56 and 58 causes the internal mechanics of the drive system 10 to turn the drive axle 50. Drive sprocket 62 is fixedly attached to the drive axle 50, such that the rotation of the drive axle 50 causes the drive sprocket to rotate as well. Drive chain 64 engages the drive sprocket 62 and transfers the drive energy from the drive system 10 to the rear wheel 28 by means of the rear drive gears 66.

Figure 2:
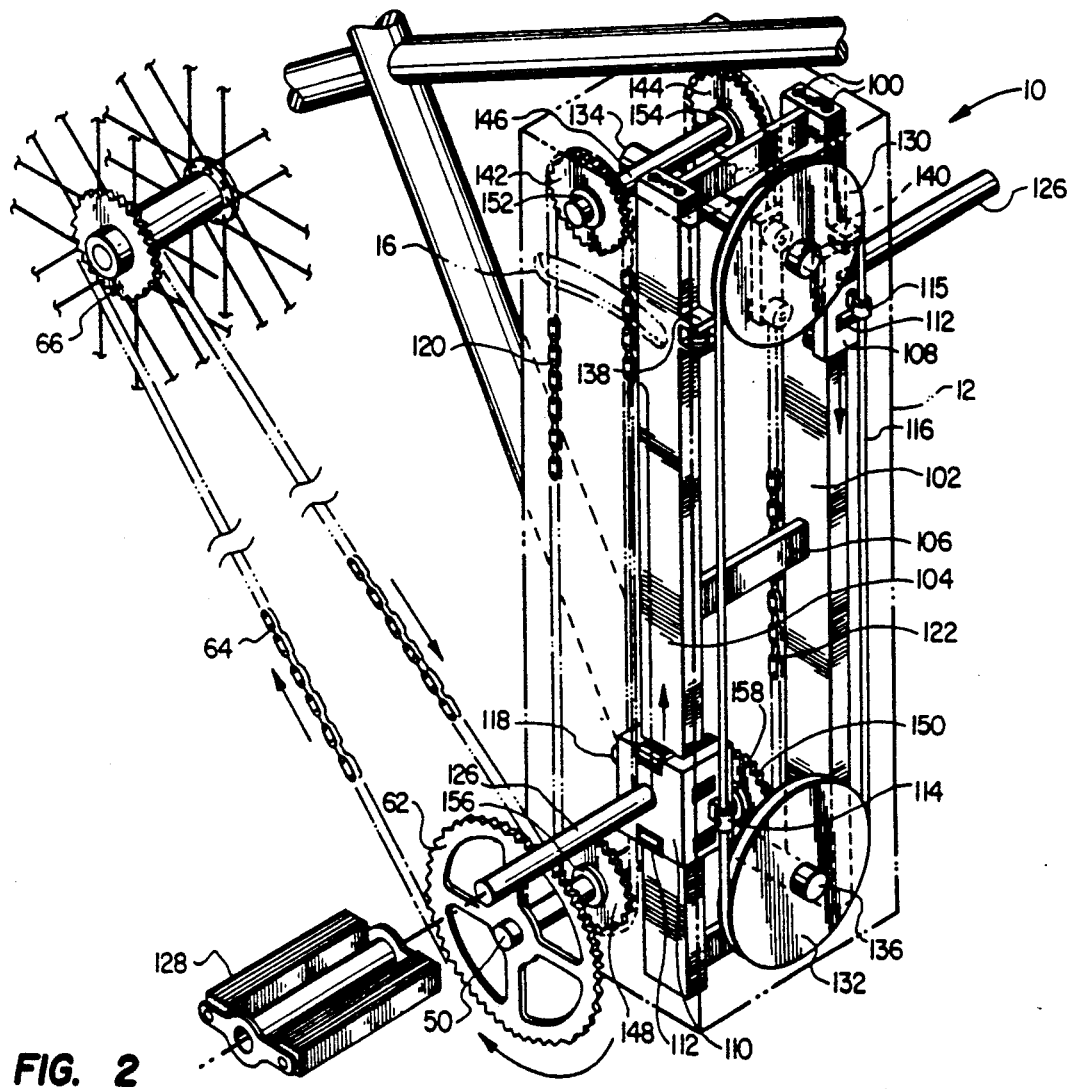
FIG. 2 is a fragmentary, perspective view of the drive system of FIG. illustrating the mechanical linkage for converting rectilinear motion to rotational motion.

Referring now to FIG. 2, there is shown a perspective view of the rectilinear travelling drive system 10 mounted within the frame of the bicycle 18. The outer housing 12 is shown in phantom such that the internal mechanics of the drive system 10 can be viewed. Mounting screws 100 secure the outer housing to the two parallel rectilinear motion guides 102, 104. The two parallel rectilinear motion guides 102 and 104 comprise the frame for the drive system 10. Cross-frame members 106 fixedly connect the parallel rectilinear motion guides 102 and 104, thereby creating the necessary structural strength.

The force block 108 is slidably mounted upon the rectilinear motion guide 102, while the force block 110 is slidably mounted upon the rectilinear motion guide 104. The force blocks 108 and 110 include a number of force block rollers 112. The force block rollers 112 are located about the force blocks 108 and 110. The force block rollers 112 slide along the rectilinear motion guides 102 and 104, thus enabling the force blocks to move along the rectilinear motion guides 102 and 104. Further included on the force blocks 108 and 110 are cable clamps 114 and 115. The cable clamp 114 secures flexible cable 116 to the force blocks 108 and 110. Located on the opposite side of the force blocks 108 and 110 from each of the cable clamps 114 and 115 are chain clamps 118 and 119 which secure the power transference chains 120 and 122 to the force blocks 108 and 110. Further included upon the force blocks 108 and 110 are horizontal force receiving bars 124 and 126. The force receiving bars 124 and 126 project orthogonally from the force blocks 108 and 10 and are provided so that the user can apply the drive force intended. In the preferred embodiment, foot pedals 128 are mounted on the force receiving bars 124 and 126.

Still referring to FIG. 2, there is illustrated upper direction reversing wheel 130 and lower direction reversing wheel 132. The flexible cable 116 is trained about the upper direction reversing wheel 130 and the lower direction reversing wheel 132, forming a closed loop. The upper direction reversing wheel rotates about upper reversing wheel axle 134, while the lower direction reversing wheel 132 rotates about lower reversing wheel axle 136. The flexible cable 116 passes through each of the cable clamps 114 and 115, thereby affixing the force blocks 108 and 110 to the flexible cable 116. The flexible cable connects the force blocks 108 and 110 in order to maintain their oppositely disposed positions along the parallel rectilinear motion guides 102 and 104. Thus, when a downward force is applied to the force block 108, it causes the flexible cable 116 to move as well. The movement of the flexible cable 116 pulls the force block 110 upward along the rectilinear motion guide 104. Consequently, a force on one of the force blocks 108 or 110 causes the other force block to automatically move in the opposite direction along the rectilinear motion guide upon which it is mounted. As a result of this automatic oscillation, the two force blocks 108 an 110 maintain their oppositely disposed positions. The upward movement of the force block 110 is terminated by force block stop 138 which is mounted upon rectilinear motion guide 104. Force block stop 140 terminates the upward movement of force block 108.

As the force blocks 108 and 110 Oscillate up and down along their respective rectilinear motion guide 102 or 104, the power transference chains 120 and 122 are driven along their loop. The power transference chain 120 begins its loop at the chain clamp 118 affixed to the force block 110. The power transference chain 120 then engages the teeth of idler sprocket 142 and proceeds to the teeth of power sprocket 148. The idler sprocket 142 is mounted on the idler axle 146, which is affixed to the inner wall of the outer housing 12 and runs perpendicular to the parallel rectilinear motion guides 102 and 104. The idler sprocket 142 is mounted on one end of the idler axle 146 and a second idler sprocket 144 is mounted on the opposite end of the idler axle 146. The idler sprockets 142 and 144 are mounted on idler bearings 152 and 154 which are directly mounted on the idler axle 146. The idler bearings 152 and 154 permit the idler sprockets 142 and 144 to rotate in either a clockwise or counter-clockwise direction.

The power transference chains 120 and 122 engage the power sprockets 148 and 150 at the lower end of the drive system 10. The power sprockets 148 and 150 are mounted on unidirectional clutches 156 and 158, which, in turn, are mounted upon the drive axle 50. The unidirectional clutches 156 and 158 enable the drive axle 50 to turn when the power sprockets 148 and 150 are rotated in the proper direction (clockwise) by the power transference chains 120 and 122. Thus, when the power transference chain 120 is rotated clockwise, e.g., the power block 110 is pushed down, the unidirectional clutch 156 is not engaged and allows the power sprocket 148 to turn the drive axle 50. At the same time, the power block 108 is pushed up, which causes power sprocket 150 to rotate counter-clockwise, thereby engaging the unidirectional clutch 158 which prevents the power sprocket 150 from attempting to rotate the drive axle 50. Consequently, there is always a rotational force being applied to the drive axle 50 by either one of the power sprockets 148 or 150. In this way the drive sprocket 62 is turned and causes drive chain 62 to rotate rear drive gears 66.

Figure 3:
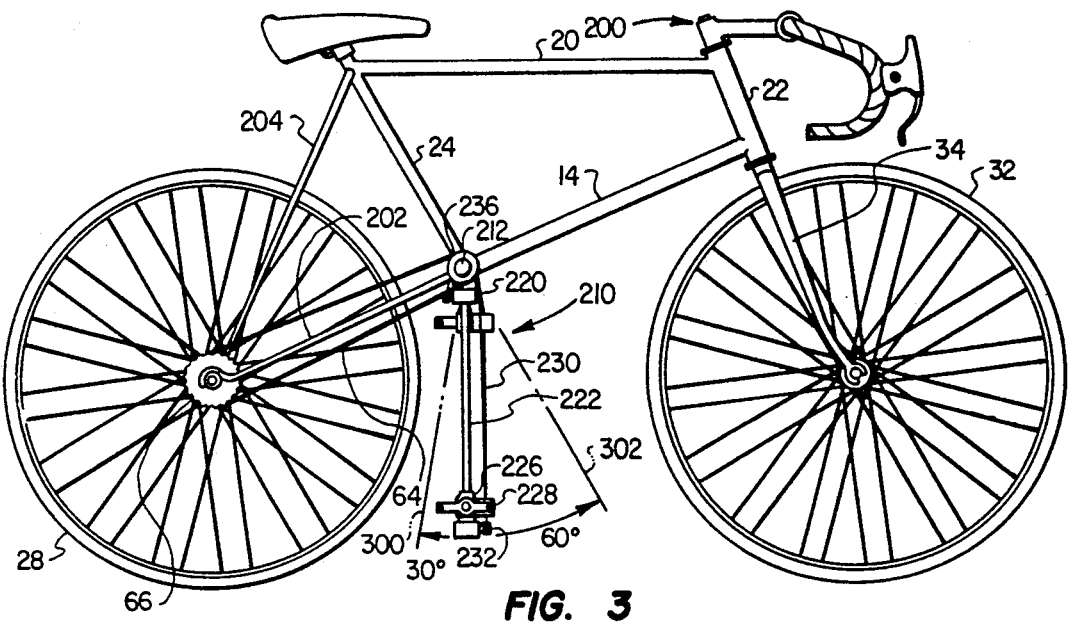
FIG. 3 is a side elevational view of a bicycle having incorporated therein a second embodiment of a drive system constructed in accordance with the principles of the present invention and illustrating the pivoting mechanism included therewith.

Referring now to FIG. 3, there is shown a preferred embodiment of the present invention, a side elevational view of an alternative bicycle 200 having an alternative embodiment of a pivotal, vertically oriented, rectilinear travelling alternative drive system 210 constructed in accordance with the principles of the present invention. Elements of the alternative bicycle 200 like or similar to the elements of the bicycle 18 (shown in FIG. 1) are identified in FIG. 3 by the same numbers. Generally, the alternative bicycle 200 is also assembled with an upper frame member 20 extending from a front frame member 22 to a rear frame member 24. Below the upper frame member 20 is an apparatus support bracket or frame member 14, which also extends from the upper frame member 20 to 10 the rear frame member 24. It may be noted that the rear frame member 24 of the alternative bicycle 200 connects with and stops at the apparatus support bracket or frame member 14. The rear frame member 24 of the alternative bicycle 200 does not connect with the lower end of the alternative drive system 210 as does the analogous element of the bicycle 18 (shown in FIG. 1). The rear wheel 28 is rotationally mounted between the forks of the forked rear member 202 and the forked seat member 204. Alternative bicycle 200 differs from bicycle 18 (shown in FIG. 1) in that alternative bicycle 200 does not include a rear fork 30 (shown in FIG. 1). Absence of the rear fork 30 (shown in FIG. 1) allows pivot of the drive system 210 at the pivot axis 212 pivotally affixed at the intersection of the rear frame member 24 and the support bracket 14 at the top-most end of the drive system 210. This arrangement of alternative bicycle 200 differs from the arrangement in bicycle 18 (shown in FIG. 1) in which the drive system 10 (shown in FIG. 1) is pivotally mounted at the bottom-most end of the drive system 10 (shown in FIG. 1) at a lower-most extension of the rear frame member 24 (shown in FIG. 1). The front wheel 32 of the alternative bicycle 200 is mounted between a front fork 34. The front fork 34 extends from the bottom of the front frame member 22.

Figure 4:
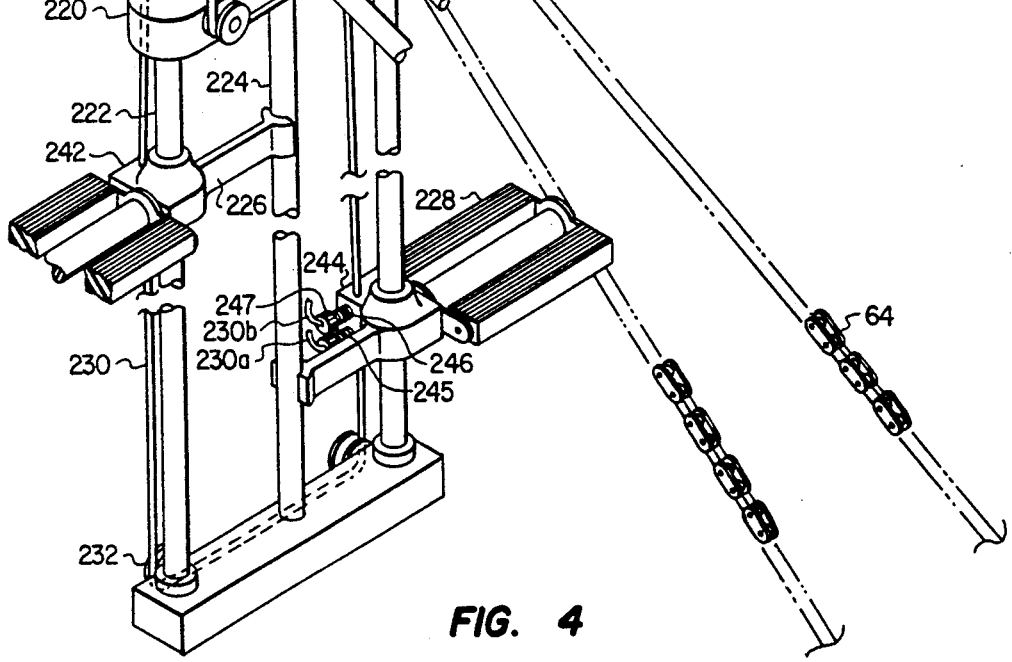
FIG. 4 is a partial, perspective view of the drive system of FIG. 3 including the pivoting mechanism and illustrating a cable linkage for converting rectilinear motion to rotational motion.

Referring now to FIGS. 3 and 4, the drive system 210 includes a drive frame 220. The drive frame 220 includes dual, parallel pedal supports 222. The pedal supports 222 provide a rectilinear guide for movement of pedals 228 therealong. The pedals 228 ride along the pedal supports 222 due to guide runners 226 affixed with each pedal 228. The guide runners may preferably include a variety of bushings and/or bearings to allow ease of movement with limited friction along the pedal supports 222.

Referring now to FIG. 4 only, a cable linkage 230 is fixed at one end 230a with one of the pedals 228 by a cable adjustment lock 244 affixed with the pedal 228. The cable linkage 230 is preferably connected at the cable adjustment lock 244 with a tension adjustment screw 245. The cable adjustment lock 244 also includes a second tension adjustment screw 246 for securing the other end 230b of the cable linkage 230. The cable linkage 230 is secured in the head 247 of each tension adjustment screw 245, 246. The tension on the cable linkage 230 may then be adjusted by turning each of the tension adjustment screws 245, 246 until the desired tension is obtained.

Figure 5:
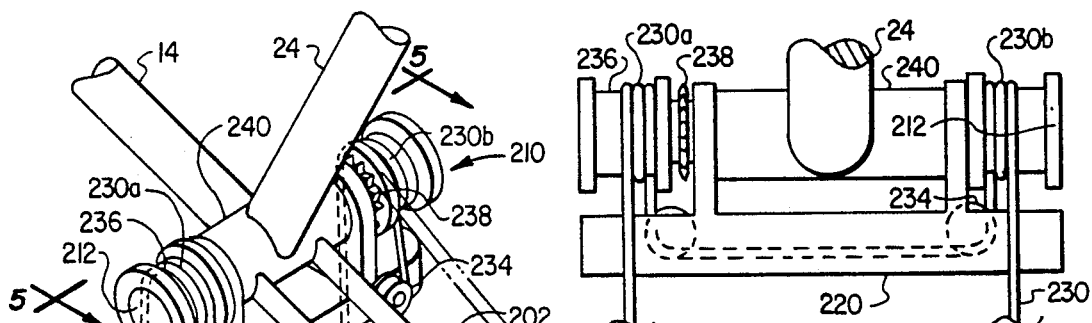
FIG. 5 is a partial cross sectional view of the drive system and pivoting mechanism of FIG. 4 taken along lines 5—5, illustrating the pivoting mechanism and the cable linkage.

Referring now to FIGS. 4 and 5, the cable linkage 230, after connecting at the cable adjustment lock 244 by means of the tension adjustment screw 245, continues along a path which may include partial turns around several, for example, two, bottom pulleys 232. The bottom pulleys 232 are preferably affixed at the bottom of the drive frame 220, although the bottom pulleys 232 could also be affixed at other locations on the drive frame 220 or otherwise. The cable linkage 230 then proceeds to fixedly connect with the other of the pedals 228 by a cable lock 242 affixed with that pedal 228. Proceeding from the cable lock 242, the cable linkage 230 then extends to wrap around a wrap spool 236 for several turns 230a, for example, three turns. The cable linkage 230 then continues along a path which may comprise several top pulleys 234, for example, two top pulleys 234, to another wrap spool 236. The cable linkage 230 also wraps around this other wrap spool 236 several turns 230b, for example, three turns, and then extends to affix at the tension adjustment screw 246 of the cable adjustment lock 244 of the first pedal 228 to complete a continuous loop.

Continuing to refer to FIG. 4, the pivot axis 212 is disposed within an axis hub 240 of the alternative bicycle 200 frame located at the intersection of the rear frame member 24 and the support bracket or frame member 14. Affixed on the pivot axis 212 to rotate therewith is a sprocket 238. The sprocket 238 is connected with a drive chain 64 which links with rear drive gears 66 (shown in FIG. 3) to cause the rear wheel 28 to rotate as the sprocket 238 rotates. The wrap spools 236 are disposed at either end of the pivot axis 212. The wrap spools 236 are each interconnected with the pivot axis by separate unidirectional clutches (not shown) such that the wrap spools 236 rotate bi-directionally in accordance with bi-directional movement of the cable linkage 230, but the pivot axis 212 rotates unidirectionally and is only engaged by a wrap spool 236 when the wrap spool 236 is rotating in the direction in which the pivot axis 212 unidirectionally rotates.

In operation of the alternative drive system 210, as the pedals 228, due to exertion of force against one of the pedals 228 by a rider, move in counter-directed rectilinear paths along the pedal supports 222, the cable linkage 230, because of the friction created by the wrapped turns 230a, 230b around the wrap spools 236 and the unidirectional clutches integrated with both the wrap spools 236 and the pivot axis 212 causes the pivot axis 212 to rotate. As the pivot axis 212 rotates, the sprocket 238 which is affixed for rotation therewith also rotates. This rotation of the sprocket 238 moves the drive chain 64, turning the rear drive gear 66 and the rear wheel 28.

Referring now to FIG. 5, there is seen a detail of the pivot axis 212 as incorporated in the top end of the alternative drive system 210. As may be seen, the drive frame 220 is affixed with the pivot axis 212 to pivot thereon. Such pivotability of the drive frame 220 allows variation of the orientation of the rectilinear motion of the pedals 228 of the alternative drive system 210. Such an arrangement allows a wide variation of pivot for the drive system 210 ranging from approximately 30° from the vertical towards the rear wheel 28 (shown by notional line 300 in FIG. 1) and up to 60° or more from the vertical towards the front wheel 32 (shown by notional line 302 in FIG. 1). As may also be seen in FIG. 5, the sprocket 238 is also disposed on the pivot axis 212. The sprocket 238 is affixed with the pivot axis 212 to rotate therewith. Outwardly disposed at the ends of the pivot axis 212 are located the dual wrap spools 236. The wrap spools 236 are integrated with the pivot axis 212 by unidirectional clutches (not shown) as previously described, and the pivot axis 212 is caused to rotate with each wrap spool 236 as the wrap spool 236 rotates in the direction in which the pivot axis 212 unidirectionally rotates. The cable linkage 230 is seen to wrap several turns 230a, 230b around each wrap spool 236 in a manner so that movement of the cable linkage 230 in response to movement by a rider of the pedals 228 in counter rectilinear motions, turns the wrap spools 236 in opposite directions due to the frictional engagement of the wrap spools 236 with the cable linkage 230 at the turns 230a, 230b.

This alternative drive system 210 shown in FIGS. 3-5 may also include several possible variations. In one such variation, the pedal supports 222 may diverge outward to the sides of the alternative bicycle 200 towards the bottom of the alternative drive system 210, rather than be located parallel as in the preferred embodiment. Under such a variation, the pedals traveling along the pedal supports 222 would thereby be caused to also diverge outward as progression is made toward the end of a downward stroke. A further variation which increases efficiency includes friction inducing material coated, wound, or otherwise placed around the hub of the wrap spools 236 at the locations of the cable linkage 230 wrap turns 230a, 230b thereon. This friction inducing material increases friction of the cable linkage 230 against the wrap spools 236, limiting slippage of the cable linkage 230 thereagainst and thus improving efficiency. As a further variation, the cable linkage 230 may be formed of a wire, rubber, composite, or other special material for added strength and friction induction. In another variation, a mechanism may be included on the alternative bicycle 200 or in the drive system 210 thereof which limits the range or restricts the freedom of pivot of the drive system 210. Such an alternative could include a bumper stop at the outermost range or ranges of the pivot or an adjustable mechanism, for example, a tension system, which limits or restricts the pivot.

Thus, there has been described and illustrated herein a pivoting drive device, which in its preferred form is mounted so that the entire apparatus is capable of pivoting on the main frame of the bicycle 200. Further the pedals 228 are arranged to move toward and away from the pivot axis 212, and the cable linkage 230 is always tangential to drive axis and pivot point. Those skilled in the art, however, will recognize that many modifications and variations in addition to those specifically mentioned herein may be made in the devices and techniques described herein without departing substantially from the concept of the present invention. Accordingly, it should be clearly understood that the form of the invention as described herein is exemplary only and is not intended as a limitation on the scope of the invention.

What is claimed is:

1. An improved bicycle drive system comprising:
   a drive frame
   means for mounting pedals on said drive frame for rectilinear motion thereon;
   means on said drive frame for generating a rotating motion from the rectilinear motion of said pedals; and
   means for pivotally mounting said drive frame upon a bicycle.

2. A drive system according to claim 1 in which said means for pivotally mounting said drive frame upon a bicycle are positioned at a lower end of said drive frame, and further comprising an arcuate support guide at an upper end of said drive frame for permitting tilting alteration of direction of said rectilinear motion of said pedals.

3. A drive system according to claim 2, wherein said means for mounting pedals on said drive frame includes first and second vertically mounted, parallel rectilinear motion guides disposed between said pedals, first and second force blocks slidably mounted on said motion guides, a flexible cable, and a means for reversing direction of said flexible cable trained about said means, said flexible cable connecting said first and second force blocks.

4. A drive system according to claim 2, wherein said means on said drive frame for generating a rotating motion includes an idler axle mounted adjacent one end of said motion guides, having first and second idler sprockets mounted on opposite ends of said idler axle, one of said idler sprockets linked to said first force block, the other of said idler sprockets linked to said second force block, a drive axle mounted adjacent the other end of said parallel rectilinear motion guides and extending thereacross, said drive axle being aligned parallel to said idler axle and having a drive wheel mounted on said drive axle for rotation therewith, first and second power sprockets mechanically interconnected with said drive axle inwardly of said drive wheel, means for unidirectionally clutching said power sprockets, and first and second power transference chains linking said first and second power sprockets to said first and second force blocks, respectively.

5. A drive system according to claim 1 in which said means for pivotally mounting said drive frame upon a bicycle are positioned at an upper end of said drive frame and are substantially co-axial with said means for generating a rotating motion from the rectilinear motion of said pedals.

6. A drive system according to claim 5, wherein said means for mounting pedals causes said pedals to diverge outward from the sides of said drive frame as said pedals are driven downward in rectilinear motion.

7. A drive system according to claim 5, wherein said means on said drive frame for generating a rotating motion includes dual wrap spools and a cable linkage attached with said means for mounting pedals and said wrap spools so that rectilinear motion of said means for mounting pedals moves said cable linkage causing said wrap spools to rotate.

8. A drive system according to claim 5, further comprising a means for limiting range of pivotal means of said drive frame.

9. A drive system according to claim 5, further comprising a means for restricting freedom of said pivotal means of said drive frame.

10. An improved bicycle drive system having pedals which operate in a rectilinear motion to generate a rotating motion, wherein the improvement is an arcuate support guide which permits tilting alteration of direction of rectilinear motion of said pedals.

11. An improved bicycle drive system for a bicycle, said system having pedals which operate in a rectilinear motion to generate a rotating motion, wherein the improvement is a pivotal mounting for said system on said bicycle which permits pivotal alteration of direction of rectilinear motion of said pedals.

* * * * *